United States Patent [19]

Kelley et al.

[11] Patent Number: 5,108,539
[45] Date of Patent: Apr. 28, 1992

[54] APPARATUS FOR THE RESILIENT SPINWELDING OF THERMOPLASTIC ARTICLES

[75] Inventors: John W. Kelley, Houston; Roy F. Smith, Pearland; William H. Korcz, Houston, all of Tex.

[73] Assignee: Shell Oil Company, Houston, Tex.

[21] Appl. No.: 513,381

[22] Filed: Apr. 23, 1990

[51] Int. Cl.⁵ ............................................ B29C 65/06
[52] U.S. Cl. ................................. 156/580; 156/73.5; 156/497; 228/2
[58] Field of Search ................. 156/69, 73.5, 285, 497, 156/580; 228/2, 112, 113

[56] References Cited

U.S. PATENT DOCUMENTS

| | | | |
|---|---|---|---|
| 3,316,135 | 4/1967 | Brown et al. | 156/285 X |
| 3,580,762 | 5/1971 | Zumstein | 156/73.5 |
| 3,860,468 | 1/1975 | Scherer | 156/73.5 |
| 4,469,547 | 9/1984 | Mitchell et al. | 156/580 X |
| 4,758,392 | 7/1988 | Collins et al. | 156/73.5 X |
| 4,853,053 | 8/1989 | Minjolle et al. | 156/73.5 |

Primary Examiner—Michael G. Wityshyn

[57] ABSTRACT

An apparatus is disclosed for the resilient spinwelding of two (thermoplastic) body portions to one another. The incorporation of resilient members between the prior art "hard surfaced" spinweld apparatus and the body portions to be welded together significantly decreases the spinweld time, and in the case of container/lid systems used for food packaging, increases the burst pressure of the container/lid.

6 Claims, 6 Drawing Sheets

COMPOSITION:
  SILICONE RUBBER
  SHORE A HARDNESS OF 60
THICKNESS:
  0.14" THICK
HOLE PLACEMENT:
  EXACTLY AS SHOWN ABOVE.

CIRCULAR HOLES CUT WITH DRILL PRESS.

COMPOSITION:
 SILICONE RUBBER
 SHORE A HARDNESS OF 60
THICKNESS:
 0.13" THICK $$\frac{\text{SPINDLE } wk^2 + \text{RING(S) } wk^2}{\text{TOTAL } wk^2}$$

INERTIAL RINGS ($wk^2$)

$wk^2 = (0.0000983)(l)(\pi)(r_o^4 - r_i^4)$

| $wk^2$ | WT (g) | OUTER DIA. (IN.) | LENGTH (IN.) |
|---|---|---|---|
| 0.0101 | SPINDLE ONLY | 1.80 | N/A |
| 0.0041 | 161.1 | 3.10 | 0.25 |
| 0.0102 | 418.4 | 3.00 | 0.75 |
| 0.0169 | 705.4 | 3.00 | 1.25 |
| 0.0433 | 757.0 | 4.40 | 0.50 |
| 0.0500 | 1300.7 | 4.00 | 1.03 |
| 0.0502 | 949.2 | 4.80 | 0.50 |
| 0.0600 | 1449.8 | 4.20 | 1.00 |
| 0.0750 | 1659.5 | 4.50 | 1.00 |
| 0.1004 | 1970.2 | 4.80 | 1.00 |

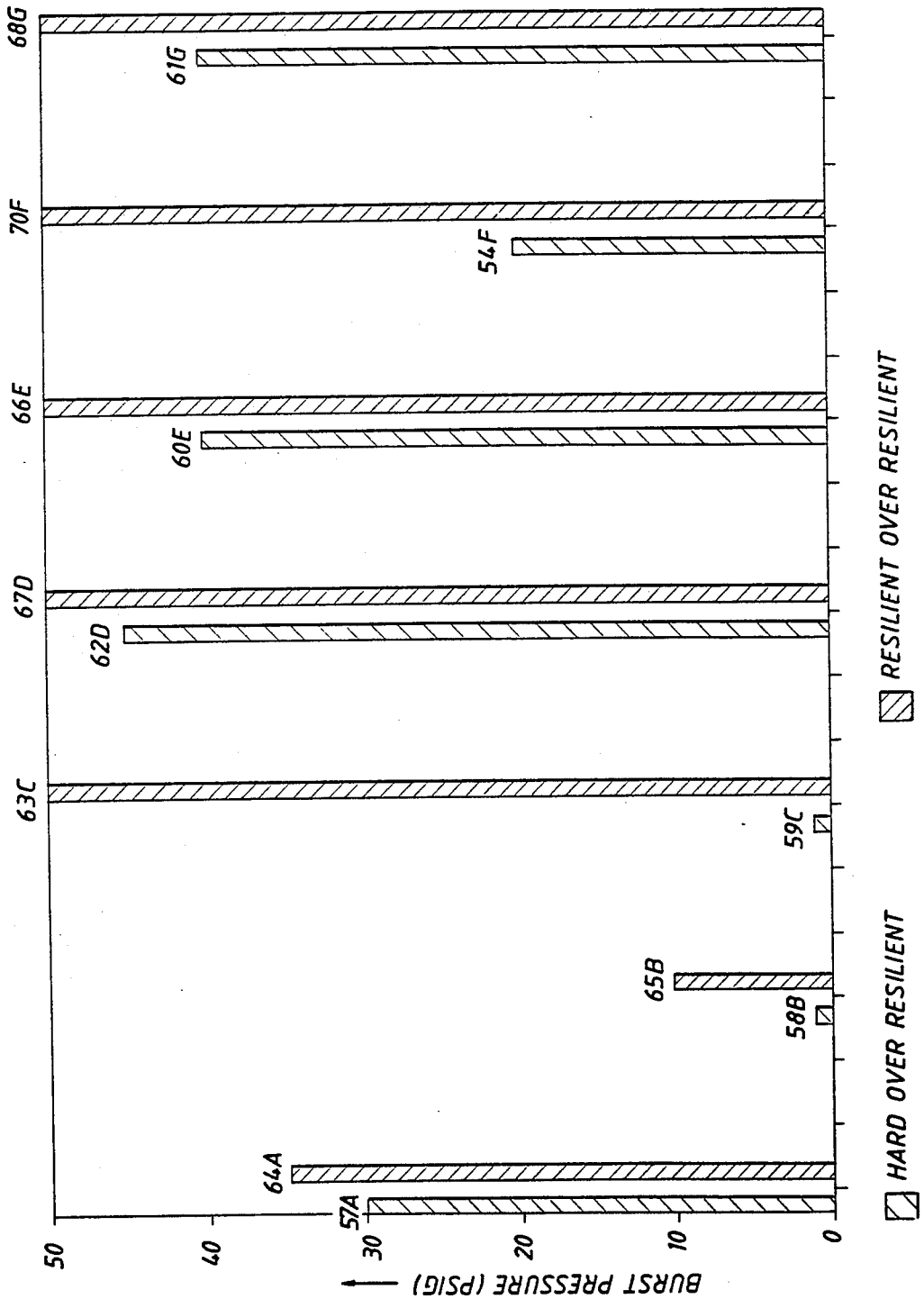

APPARATUS FOR THE RESILIENT SPINWELDING OF THERMOPLASTIC ARTICLES

BACKGROUND OF THE INVENTION

Related Application

This application is related to a co-pending application entitled "Method For The Resilient Spinwelding of Thermoplastic Articles", R. Frank Smith, John W. Kelley, and William H. Korcz inventors, filed Apr. 23, 1990, Ser. No. 513,643, now U.S. Pat. No. 5,064,485.

Field of the Invention

This invention relates to improvements in spinwelding apparatus wherein plastic workpieces are held together and spun relative to one other so as to cause friction therebetween. The heat generated by the friction creates melt which fuses the workpieces together at their contacting surfaces. Such plastic workpieces may comprise, for example, cups and lids used in the food packaging industry.

Description of the Prior Art

Spinwelding is a technique which is used to meld together two thermoplastic workpieces. As is generally known, there are two methods of friction welding, one of which is called the pivot method, the other being the inertial method.

According to the pivot method, the workpieces are aligned axially relative to each other. One workpiece is secured to a rotatable shaft and the other workpiece is held stationary. The front end of the workpiece attached to the rotatable shaft is pressed against the front end of the stationary workpiece and the former workpiece is rotated under axial force. The common surfaces are pressed together and the workpieces are thereby heated by the frictional heat and become plastic. When heated sufficiently to accomplish a weld, a mechanical brake is applied to stop relative rotation between the workpieces.

According to the inertial method (of the present invention), one workpiece is secured to a rotatable shaft on which "rotary inertia rings" are provided. The entire assembly is then rotated up to a desired RPM (revolutions per minute) so as to establish a desired amount of kinetic energy in the rotating assembly. The workpieces are then pressed together and the stored kinetic energy of the assembly is converted into frictional heat at the contact area to soften the contact area and the plastic in the surrounding vicinity. When the rotational energy of the shaft is dissipated, the weld is finished. The rotary inertia rings and initial rate of rotation may be changed to vary the amount of energy input into the weld area.

These two methods are practiced, singly or in combination, in the following U.S. Patents:

U.S. Pat. No. 3,244,574 discloses the provision of means for producing a partially evacuated cavity between two spinwelded workpieces.

U.S. Pat. No. 3,275,179 relates to the preparation of milk bottles and other containers formed from foamed plastic laminate.

U.S. Pat. No. 3,438,825 discloses spinwelding a ring to the surface of an article such as a polyethylene box.

U.S. Pat. No. 3,580,739 discloses welding thermoplastic sheet material by using conical shaped thermoplastic buttons to join the edges of two thermoplastic sheets, as well as a friction drive mountable in a hand drill for spinwelding the thermoplastic buttons to the sheets.

U.S. Pat. No. 3,609,854 discusses a method of removing weld flash after two articles have been spinwelded together.

U.S. Pat. No. 3,690,088 discloses a method of sealably securing a closure element to a flexible tube.

U.S. Pat. No. 3,917,497 discloses the spinwelding of thermoplastic tubing with enlarged end portions to fittings to provide compression type seal joints.

U.S. Pat. No. 3,980,248 discloses a method of fabrication of a bobbin.

U.S. Pat. No. 4,090,898 discloses the use of a gripping member with radially closable jaws contactable with a first thermoplastic workpiece which is mounted upon a second workpiece.

U.S. Pat. No. 4,457,795 discloses a method and apparatus for spin welding together soft and flexible thermoplastic tubes initially held in a telescoping relationship.

And finally, U.S. Pat. No. 4,534,751 discloses a method and apparatus for attaching a thermoplastic container end onto a paper board sidewall, wherein the sidewall is coated with a thermoplastic film, to produce a container.

The above prior art references disclose the use of "hard surfaced" spinning and mounting apparatus, such that there is no mechanical resiliency incorporated into the mandrels, jaws, stationary supports, collets, or other gripping apparatus used to rotate and force one plastic article against another, during the spinwelding process.

A version of the "hard surfaced" apparatus was initially purchased in an unsuccessful attempt to spinweld seven lids to a corresponding number of container flanges, each lid and flange having flat annular mating surfaces. Only one of the spinwelded containers/lids, (sample 55F), was of such quality so as to even warrant burst testing, (the burst test results are given for samples 53A through 48G in the left portion of Table 1, included herein). Sample 55F, however, exhibited a burst pressure of only 20 psig, which is not considered a quality burst pressure for a "robust" weld. A robust weld would have a burst pressure of approximately 50 psig, indicative of the existence of a hermetic seal at the annular mating surfaces.

The desired 50 psig is not driven by a retort pressurization requirement. It is likely that the achievement of a 20 psi pressure differential across the container/lid boundary would meet retort requirements. However, 50 psig is an indicator that a truly robust and hermetic seal has been made which is just as important. At this pressure, the failure mechanism of the container/lid system is rupture (material failure) of the thin lid, and the weld is stronger than the lid material.

An additional problem was encountered during the spinwelding of these seven samples in that it took approximately 1 second to spinweld each lid to each container flange, a time apparently unacceptable in the area of mass-produced food packaging processes.

An apparatus therefore needs to be developed that would allow the quick joinder of a lid to a container wherein the resultant lidded container would be able to achieve burst pressures of approximately 50 psig in a consistent manner.

SUMMARY OF THE INVENTION

The resilient spinweld apparatus of the present invention comprises at least one resilient mount that is positioned between the prior art hard surfaced spinwelding apparatus and the first and/or second body portions of the thermoplastic article to be joined. In other words the first and second body portions to be spinwelded together, such as a cup, (the first body portion), and its complemental lid, (the second body portion), are engaged in a resilient manner by a resilient mount apparatus, the resilient mount apparatus being interposed between the "hard" surfaces of the spinweld apparatus of the prior art and the first and second body portions.

It has been found that inclusion of the resilient mounts significally reduced the spinweld time of the lid to the container flange. The resultant mechanical joint between the lid and the container flange has also exhibited a dramatic increase in burst pressure, as shown in Table 1. The visual appearance and hence the esthetic quality of the weld has also increased dramatically.

In a preferred embodiment the second resilient mount is a resilient disk, which initially holds the lid a spaced distance away from the cup flange. The resilient disk is capable of movement toward the cup flange and the first resilient mount, (a resilient ring), so as to contact the lid and cup flange together at their complemental annular mating surfaces.

Rotation of the resilient disk relative to the resilient ring spinwelds the lid to the cup flange at the annular mating surfaces when the lid and cup flange are contacted together. The resilient spinweld apparatus typically includes a hydraulic, pneumatic, or other mechanical device that can move the lid and cup flange together at their annular mating surfaces, as well as another device that can spin one of the resilient mounts when the lid and cup flange are contacted together so as to spinweld the cup to the lid at the annular mating surfaces.

In an alternative embodiment only one resilient mount may be used to isolate one body portion from the "hard" prior art spin weld apparatus, yet still yield an improvement in the mechanical properties of the spinwelded joint. Such a single resilient mount was found to improve the mechanical properties of the cup flange and lid when the resilient mount, (in this case a resilient disk), was placed between the rotatable spin head and the lid. Depending on the degree of improvement required in the mechanical joint, either one, or most preferably, two resilient mounts may be used to either partially or fully isolate the body portions to be joined from the prior art hard surfaced spinweld apparatus.

Whereas the resilient spinweld teachings of the present invention are directed to the inertial method of spinwelding, it should be well recognized that these teachings may also be applied to the pivot method of spinwelding.

It should be noted that this invention resulted by chance. The lids were being (unsuccessfully) spinwelded to the container flanges using the prior art hard surfaced spinweld apparatus, when it was decided to use a resilient disk having vacuum openings defined therethrough to hold the lid above the cup flange as the lid was spun. The next lid joined to a cup flange exhibited improved mechanical properties, and an investigation of the causes for these improvements was initiated.

Subsequent lab testing using a resilient ring underneath the cup flange yielded further improvements. It is still not known why the resilient mount system yields spin weld joints having improved mechanical and burst pressure properties. For this reason, the Figures and description of the invention included below are more empirical than analytical. The Figures, for example, set forth the actual dimensions of the test apparatus used for the collection of the Table 1 data, in case one skilled in the art would wish to devote further study to this invention.

It is therefore an object of the invention to provide a resilient spinweld apparatus capable of producing improved mechanical joints.

It is a further object of the present invention to reduce spinweld cycle time by use of the resilient spinweld apparatus.

It is a feature of the present invention to resiliently isolate at least one body portion from the prior art hard surfaced spinweld apparatus.

These and other features, objects and advantages of the present invention will become apparent from the following detailed description, wherein reference is made to the Figures in the accompanying drawings.

BRIEF DESCRIPTION OF THE DRAWINGS

FIG. 9 compares the burst pressure of welded cups, using either a single resilient mount, or two resilient mounts on either side of the cup and lid assembly.

DESCRIPTION OF THE PREFERRED EMBODIMENT

Figure 1:
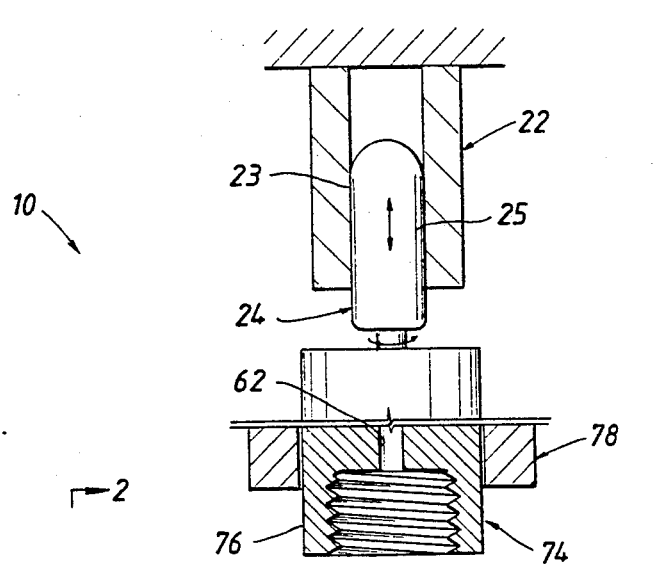
FIG. 1 is a schematic representation in a side view in partial cross section of the resilient spinweld apparatus.
Figure 1:
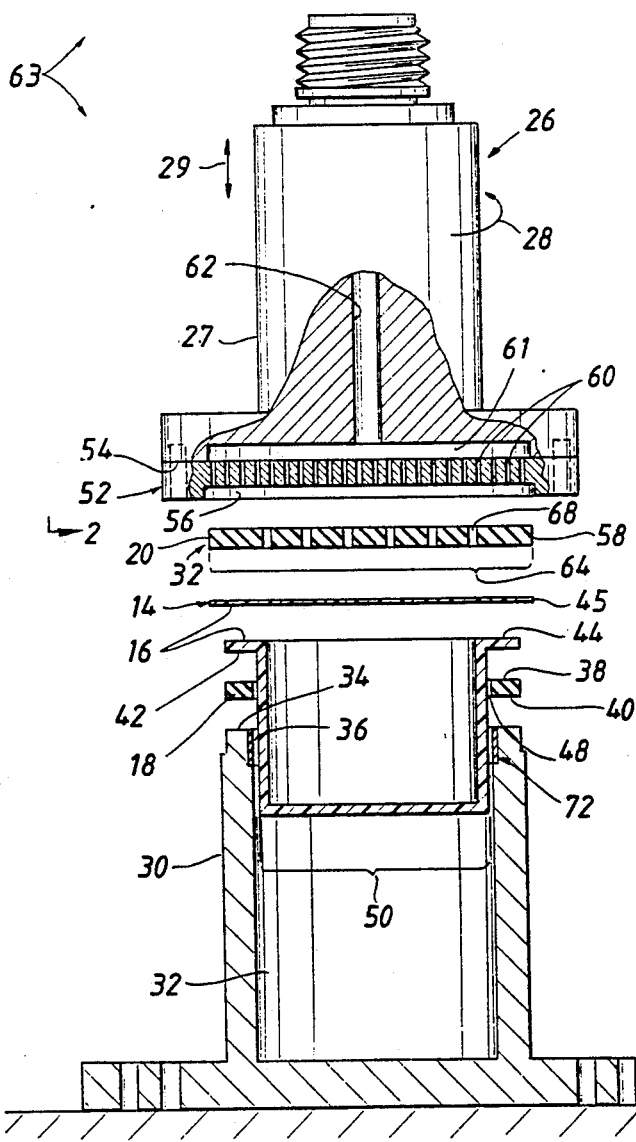
Figure 2:
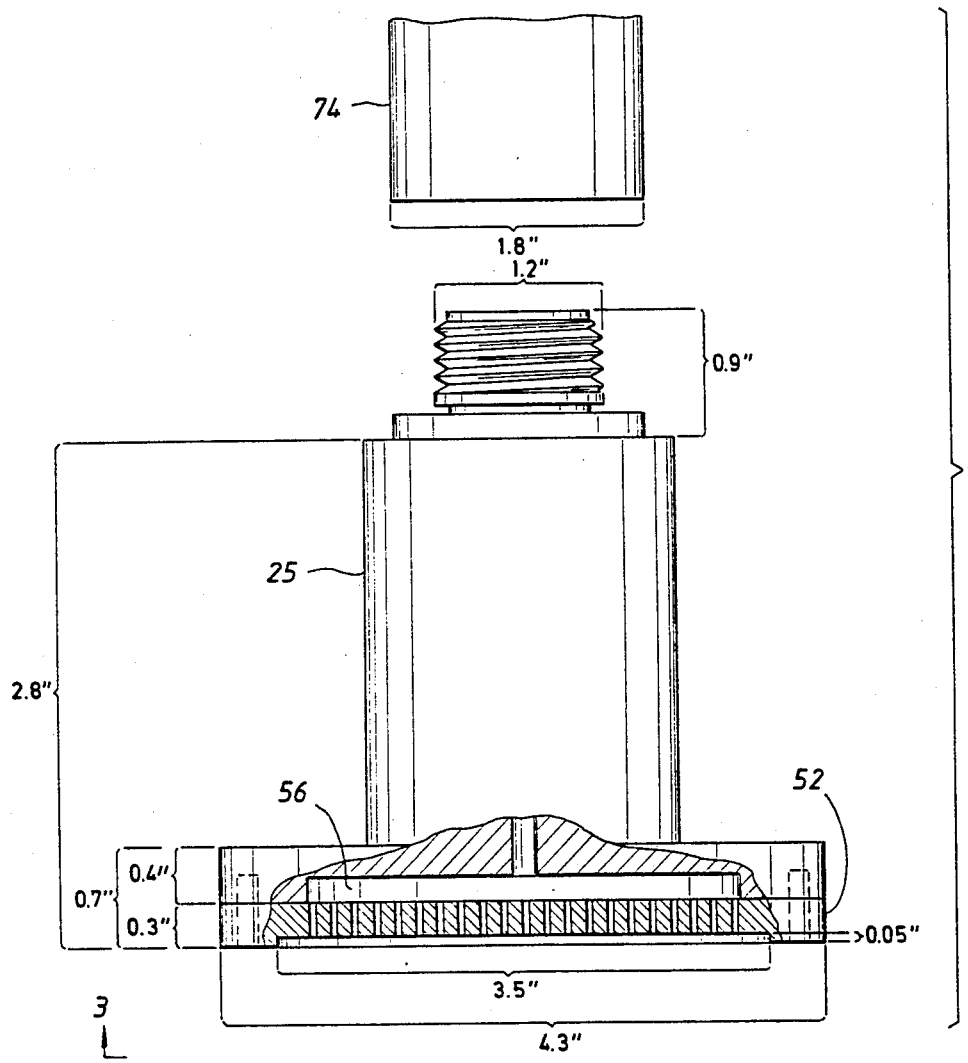
FIGS. 2-8 show various dimensioned views of the various elements of the spinweld apparatus, including the spin head, vacuum plate, resilient disk, cup dimensions, resilient ring, cup holder, anti-spin boot, and inertial rings.
Figure 3:
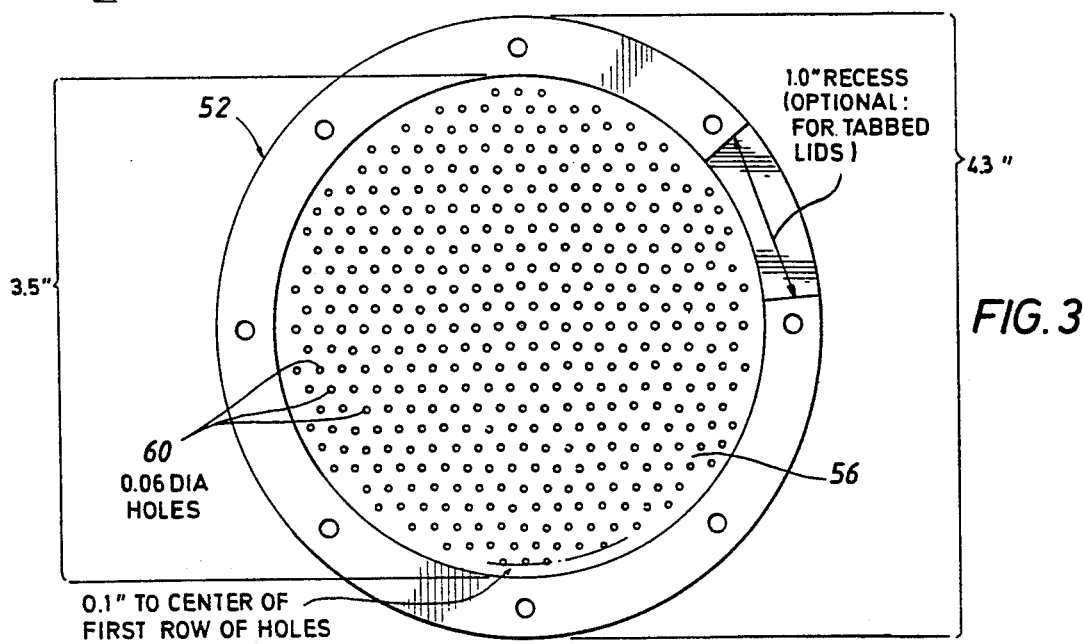

Referring now to FIG. 1, a resilient spinwelding apparatus 10 for use in the manufacture of articles having a first body portion 12 and a second body portion 14 complemental with one another is shown. The body portions 12, 14 are formed with cooperatively mating annular mating surfaces 16. In a preferred embodiment the resilient spinwelding apparatus 10 comprises a first resilient mount 18 operatively engageable to the first body portion 12. The spinwelding apparatus also includes a second resilient mount 20 operatively engageable to the second body portion 14.

The second resilient mount 20 initially holds the second body portion a spaced distance away from the first body portion 12, the second resilient mount being moveable relative to the first resilient mount so as to allow the contact of the body portions at their respective cooperative annular mating surfaces. Rotation of the second resilient mount relative to the first resilient mount spinwelds the body portions together at their annular mating surfaces when they are contacted together.

Axial movement means 22 such as a slidable shaft assembly 23 well known to the art is included to move at least one of the resilient mounts toward the other so as to contact the body portions at the mating surfaces thereof. Rotatable movement means 24 such as an electric motor 25 is included to spin at least one of the resilient mounts relative to the other when the body portions are contacted together, so as to spinweld the body portions together at their annular mating surfaces.

The spinwelding apparatus that was modified to practice the teachings of the present invention was purchased from Olsen Manufacturing Company, Model SPWI-EC. The Olsen machine, during the collection of the various data shown in Table 1, applied a total load of approximately 38.6 lbs. to the annular mating surfaces, throughout most of the welding cycle. A 28.1 lb. precompressed load was immediately applied after the initial contact between the body portions, with another 10.5 lb. load resulting from subsequent spring compression.

The second support 27, commonly referred to as "spinhead 26" of the Olsen machine would descend downwardly at approximately 16" per second, being driven downwardly by the axial movement means 22. The total load was applied by an internal 100 lbs/in spring which was pre-compressed a distance of 0.281 inches and subsequently compressed another 0.105 inches during the downward travel to exert the approximately 38.6 lb. total load.

Operation of the rotatable movement means 24 and axial movement means 22 can thereby be seen to impart to the spinhead 26 both reciprocatory movement indicated by arrow 29 as well as rotational movement indicated by arrow 28. It should be well recognized that the same mechanical effect may be accomplished by moving first support 30 in a similar manner relative to second support 27, or by other means well known to the art.

In an alternative embodiment it may be desired to merely incorporate one resilient mount in the resilient spinwelding apparatus 10. In this alternative embodiment, by way of illustration, the first resilient mount 18 would be deleted from the apparatus such that the first support 30 would support or be operatively engaged to the first body portion 12. Resilient mount means 32 comprising a second resilient mount 20 would be operatively engaged to the second support 27, the resilient mount means being operatively engageable, such as by an adhesive or by use of vacuum openings, to the second body portion 14. The supports 27, 30 and the resilient mount means 32 would be initially spaced to hold the body portions apart and would be thereafter moveable towards one another as well being rotatable relative to one another so as to spinweld the first and second body portions together.

It should be well recognized that many other methods of resiliently isolating the first and second body portions from the prior art hard-surfaced spinweld apparatus may be practiced according to the teachings of this invention to accomplish the same mechanical result. In the case of spinwelding thermoplastic pipe, for example, one would merely surround the end portions of the pipe with a rubber sheath at the point of contact with the collet/clamp mechanism.

More specifically, referring now to the preferred embodiment having two resilient mounts 18, 20, (and using more specific element identification labelling language), the first support, (specifically referred to as a cupholder), can be seen to have a cavity 32 defined downwardly therein for receiving a portion of the first body portion, (specifically referred to as a cup), the first support also having a shoulder 34 defined in an annular manner at the mouth 36 of the cavity.

The first resilient mount, (a resilient ring), is supported by the shoulder of the cupholder, the resilient ring having an end face 38 shaped to operatively engage the cup. The lower face 40 of the resilient ring will be carried by the annular shoulder 34. The end face 38 in turn will engage the bottom face 42 of the cup. The apparatus would also include the second support 27, (the spinhead), and the second resilient mount 20, (a resilient disk), along with the movement means 22, 24.

Referring now to the second body portion 14 as a lid, the resilient disk is operatively engageable with the lid, and also to the spin head. The resilient disk initially holds the lid a spaced distance away from the cup, the resilient disk being moveable toward the resilient ring when the cup is carried by the resilient ring and the lid is operatively engaged by the resilient disk, so as to contact the cup flange and lid at the annular mating surfaces. As before, rotational movement of the resilient disk relative to the resilient ring will cause the cup flange to become spinwelded to the lid at the annular mating surfaces when the cup flange and lid are contacted together.

The resilient ring in the preferred embodiment has a circular opening 48 defined therethrough having a diameter at least equal to the outer diameter 50 of the cup.

To initially hold the resilient disk to the spin head prior to spinning the spin head, vacuum grease, manufactured for example by Dow Corning, is applied to the disk and/or to vacuum plate 52 carried on the surface of the spinhead facing the resilient disk, the vacuum plate having a recess cavity 56 defined upwardly therein, the cavity being sized for acceptance of the resilient disk, the resilient disk having a periphery 58 shaped to fit upwardly within the recess cavity 56. The recess cavity is connected via vacuum plate openings 60 defined through the vacuum plate and vacuum cavity 61 to a central vacuum opening 62 defined through the center of the spinhead. The vacuum plate openings 60, vacuum cavity 61, and central vacuum opening 62 comprise vacuum means 63 well known to the art useful in the application of atmospheric pressure to hold a member in a preferred location.

Drawing a vacuum through the central vacuum opening 62 operatively engages and retains the resilient disk adjacent to the vacuum plate by atmospheric pressure acting on a portion of the disk, during the spinning of the spin head.

The resilient disk has an outer diameter 64 at least as great as the outer radius of the annular mating surfaces 16.

Figure 4:
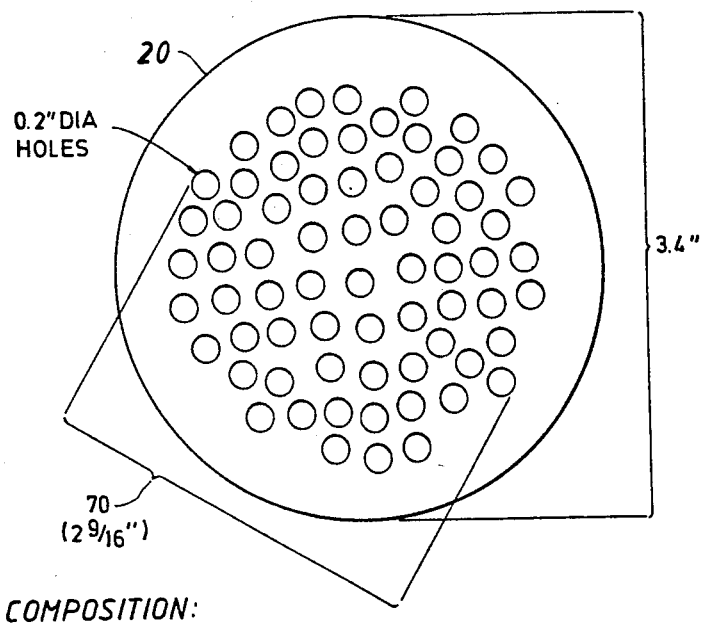
Figure 5:
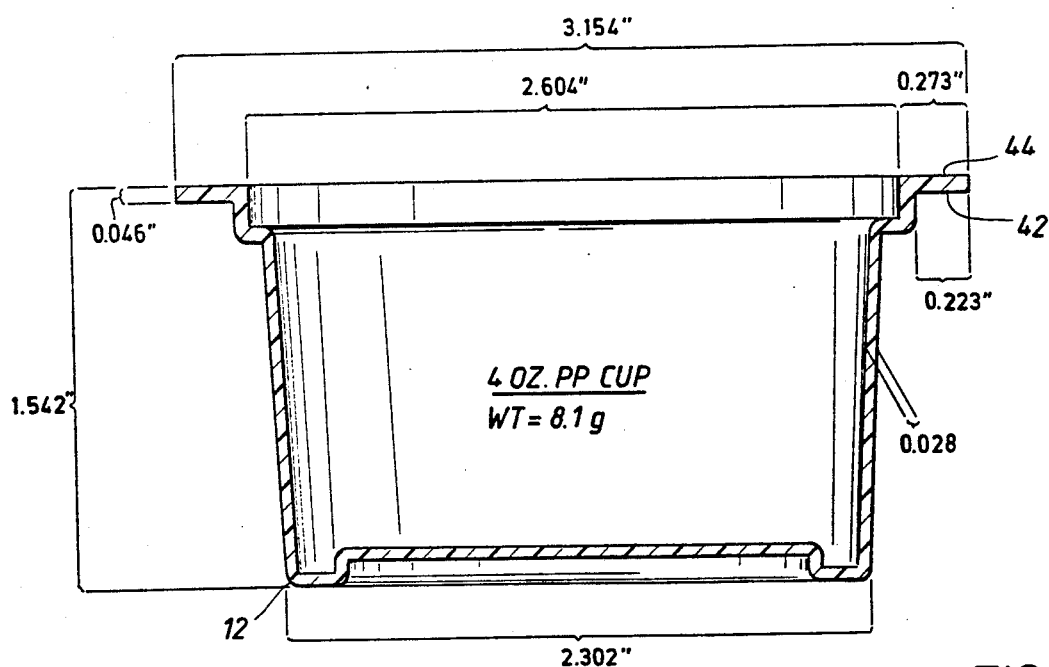
Figure 6:
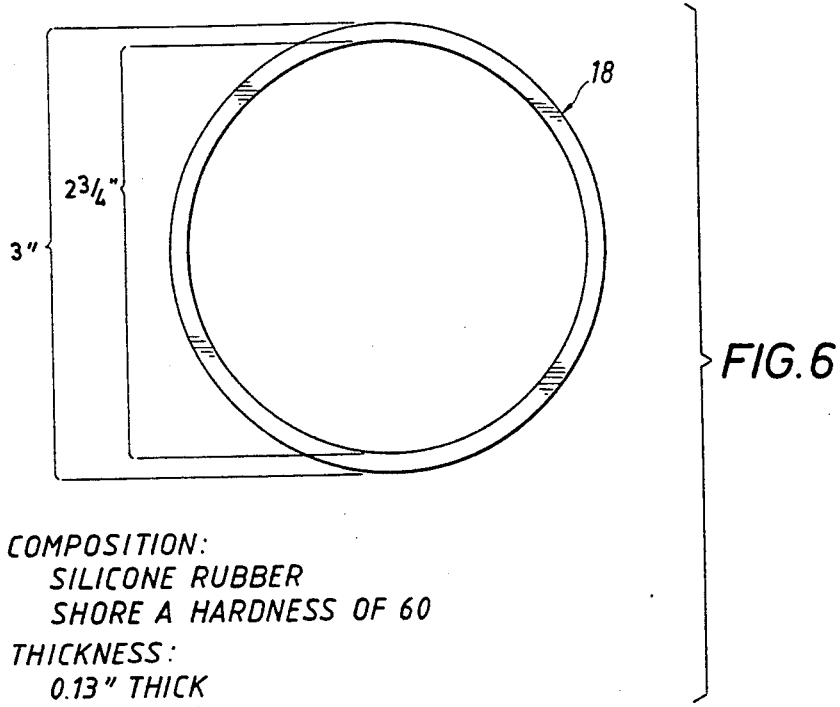
Figure 7:
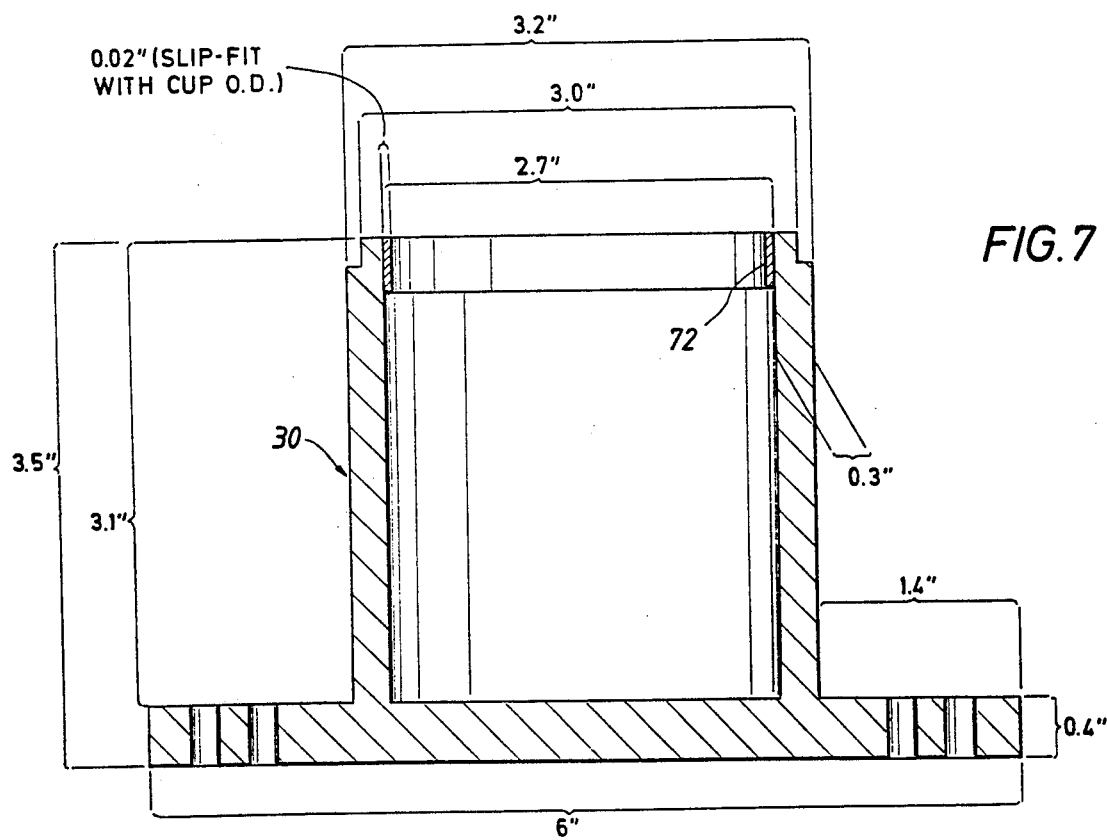

To hold the lid attached to the resilient disk the resilient disk futher includes a group of openings 68 defined upwardly therethrough, the outer diameter 70 (FIG. 4) of said group of openings being less than the inner radius of the annular mating surfaces, the openings 68 being in fluid communication with the central vacuum opening 62 via vacuum plate openings 60 and vacuum cavity 61, as is well known to the art.

The cup holder can also be seen to include an antispin boot 72 used to prevent the cup from rotating within the cavity 32 when the spinning lid is contacted with the cup flange 44. The antispin boot has a thickness of approximately 0.02 inches and is sized on its inner diameter to slip-fit with the cup outer diameter.

The spinhead also includes a spindle 74 operatively engaged at the upper portion of the spinhead, the spindle's outer radial surface 76 forming a surface for attachment of inertia rings 78 (FIG. 8) thereto.

Figure 8:
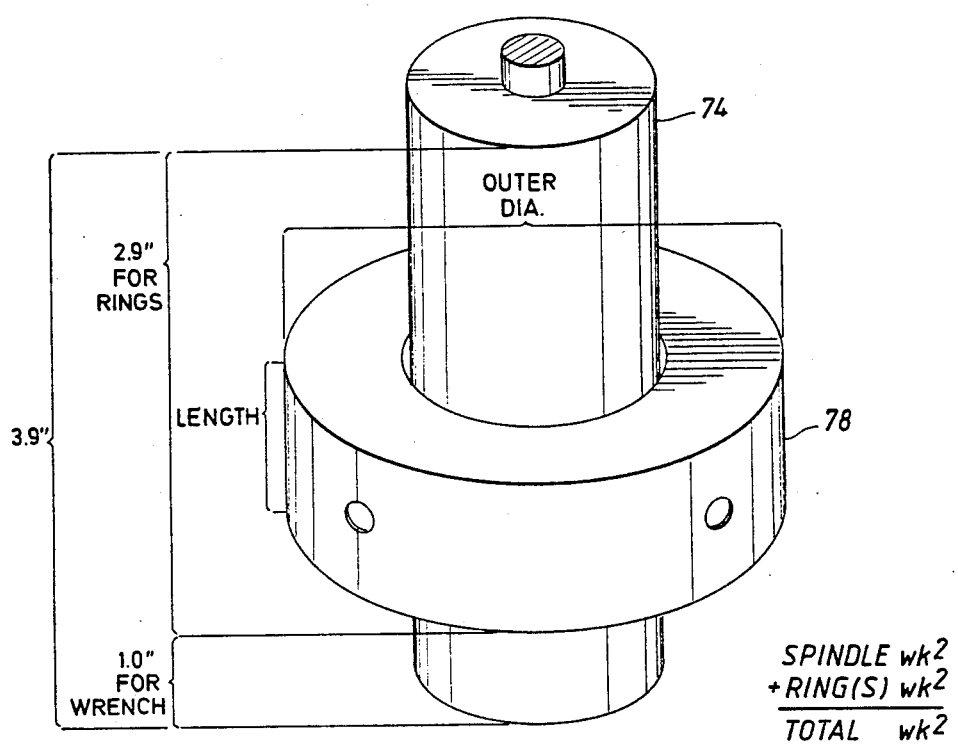

In a preferred embodiment the inertia rings 78 are formed from steel and for a particular inertia value have particular outer diameters and lengths as shown in FIG. 8. The other dimensions of the test equipment, cup, cup flange, and lid are as shown in FIGS. 2-8.

The cup and lids were formed from Huntsman Polypropylene 5384. The lids were cut from extruded sheet material, having a thickness of 15 mils. The Huntsman Polypropylene 5384 may be ordered from Huntsman Polypropylene Corporation, 907 North Elm Street, Suite 301, Hinsdale, Ill. 60521. This is a homopolymer with a nominal melt flow of 3.0. The lidstock was extrusion cast and the properties of the lidstock in the machine and transverse direction were measured, and found to be balanced.

The resilient ring used beneath the cup flange is a dense, silicone rubber with a nominal thickness of 125 mils, (0.125 inches) and a Shore A durometer hardness of 60.

In operation, the resilient ring and resilient disk would be used. The spinhead would be initially rotated from approximately 2,000 revolutions per minute to about 3,000 revolutions per minute. This, of course, would depend on the amount of energy and calories that it would be desired to input into a particular given welded area.

It should be well understood that this RPM range is very specific only to the particular annular area and other inertial and geometric parameters inherent in the samples represented in Table 1. RPMs are not a stand alone variable treatable outside a broader context of annular area, inertial mass, and compression; all will affect a preferred, even workable RPM choice. The RPM range that would be selected for the spinwelding of other samples having differing geometric, material, inertial, or other properties, would probably differ from those given in Table 1.

The lid and cup would then be operatively engaged between the resilient disk and resilient ring so as to position the annular mating surfaces of the cup flange and lid facing one another. The cup would be carried by the resilient ring and the lid would be held by vacuum to the underside of the resilient disk, the disk in turn held by vacuum grease and/or vacuum to the vacuum plate. The spinhead would be brought up to the desired RPM and thereafter the resilient disk and ring would be moved toward one another, so as to move the lid and cup flange toward one another. The rotatably moving annular mating surfaces of the lid and cup flange would thereafter be brought into contact with one another so as to spinweld the cup flange and lid at their annular mating surfaces.

In an alternative embodiment only one resilient mount would be used, the body portions would be held apart while the spinhead was brought up to operating RPM, and thereafter the annular mating surfaces of the body portions would be brought into contact with one another to complete the spinweld between the portions.

Referring now to Table 1 it can be seen that the burst pressure of the joined cup/lid (food) container increases as more resiliency is built into the overall spin weld apparatus. Only one burst pressure of 20 psi was measured when both a hard lid holder and a hard cup holder were used, with all other specimens exhibiting non-bonding and zero resistance to pressurization. When a resilient lid holder and a hard cup holder were used, the burst pressure of some measured samples increased. Using a hard lid holder and a resilient cup holder yielded similiar results, but slightly lower, on the average, burst pressures. When both the resilient lid holder and resilient cup holder were used, (samples 64A, 65B, 63C, 67D, 66E, 70F, 68G), it can be seen that the burst pressures of most of the samples consistently could reach the desired operating pressures of 50 psig.

TABLE 1

| SPIN WELD - TEST RESULTS | | | | | | | | | | | | | | |
|---|---|---|---|---|---|---|---|---|---|---|---|---|---|---|
| Sample: | 53A | 52B | 51C | 49D | 50E | 55F | 48G | 40A | 42B | 43C | 44D | 45E | 46F | 47G |
| Apparatus Set-Up: | ←HARD LID HOLDER → HARD CUP HOLDER | | | | | | | | | ←RESILIENT LID HOLDER → HARD CUP HOLDER | | | | |
| Burst Pressure (Psig)[5,6] | NA | NA | NA | NA | NA | 20 | NA | NA | 5 | 50 | 15 | 30 | 55 | 25 |
| Weld Time (Secs.) | .811 | 1.154 | .872 | .840 | .850 | NA | .768 | .301 | .307 | .246 | .370 | .308 | .362 | .400 |
| Revs to Weld | 12.00 | 12.88 | 17.50 | 15.50 | 14.63 | NA | 16.75 | 4.25 | 4.125 | 5.375 | 7.375 | 5.250 | 9.375 | 8.875 |
| Energy Input[1] | Low | Low | Mid | Mid | Mid | High | High | Low | Low | Mid | Mid | Mid | High | High |
| Visual Appearance[2] | 0 | 0 | 0 | 0 | 0 | 00 | 0 | 0 | 00 | +++ | 0000 | +++ | + | + |
| Flash Rating[3] (Inner/Outer) | NA | NA | NA | NA | NA | N-N | NA | NA | N-N | N-N | SL-SL | SL-SL | SL-M | SL-M |
| Postweld Thickness (Mils)[4] | NA | NA | NA | NA | NA | NA | NA | NA | 0 | −4 | −2 | −2 | −3 | −3 |
| Actual Spinhead RPM | 1707 | 1428 | 2281 | 2106 | 1920 | 2854 | 2322 | 1717 | 1423 | 2272 | 2097 | 1919 | 2860 | 2325 |
| Energy Input (Calories) | 21.6 | 21.9 | 29.0 | 29.3 | 29.4 | 36.0 | 35.8 | 21.6 | 21.9 | 29.0 | 29.3 | 29.4 | 36.0 | 35.8 |
| WK[2] | .1351 | .1951 | .1020 | .1201 | .1451 | .0803 | .1201 | .1351 | .1951 | .1020 | .1201 | .1451 | .0803 | .1201 |
| | Increasing System Resiliency → | | | | | | | Increasing Burst Pressure → | | | | | | |
| Sample: | 57A | 58B | 59C | 62D | 60E | 54F(69F) | 61G | 64A | 65B | 63C | 67D | 66E | 70F | 68G |
| Apparatus Set-Up: | ←HARD LID HOLDER → RESILIENT CUP HOLDER | | | | | | | ←RESILIENT LID HOLDER → RESILIENT CUP HOLDER | | | | | | |
| Burst Pressure (Psig)[5,6] | 30 | 0 | 0 | 45 | 40 | 20 | 40 | 35 | 10 | 50 | 50 | 50 | 50 | 50 |
| Weld Time (Secs.) | 7→NA | NA | NA | NA | NA | NA | NA | NA | NA | NA | NA | NA | NA | NA |
| Revs to Weld | 7→NA | NA | NA | NA | NA | NA | NA | NA | NA | NA | NA | NA | NA | NA |
| Energy Input[1] | Low | Low | Mid | Mid | Mid | High | High | Low | Low | Mid | Mid | Mid | High | High |
| Visual Appearance[2] | 00 | 000 | 0000 | + | + | 00(+) | ++ | 0 | 000 | +++ | +++ | +++ | +++ | ++++++ |

TABLE 1-continued

SPIN WELD - TEST RESULTS

| | | | | | | | | | | | | | |
|---|---|---|---|---|---|---|---|---|---|---|---|---|---|
| Flash Rating[3] (Inner/Outer) | Sl/N | N | L-N | L-N | M | N-L(H) | M-L | L-N | L-N | M-Sl | M-SL | M-N | H-M | H-M |
| Postweld Thickness (Mils)[4] | −3 | −2 | 0 | −6 | −6 | −(−10) | −7 | −4 | −4 | −4 | −5 | −6 | −9 | −8 |
| Actual Spinhead RPM | 1700 | 1425 | 2270 | 2105 | 1917 | 2850 | 2325 | 1700 | 1425 | 2270 | 2105 | 1917 | 2850 | 2325 |
| Energy Input (Calories) | 21.6 | 21.9 | 29.0 | 29.3 | 29.4 | 36.0 | 35.8 | 21.6 | 21.9 | 29.0 | 29.3 | 29.4 | 36.0 | 35.8 |
| WK[2] | .1351 | .1951 | .1020 | .1201 | .1451 | .0803 | .1201 | .1351 | .1951 | .1020 | .1201 | .1451 | .0803 | .1201 |

[1] Low = 22 calories; Mid = 29 Calories; High = 36 calories.
[2] ++++ to 0000 (Eight ratings) in the following order: Perfect Weld; Nearly Perfect; <10% unwetted area; 10-30% unwetted; 30-50% unwetted; 50-70% unwetted; 70-90% unwetted; No Bond.
[3] N = None; SL = Slight; L = Low; M = Moderate; H = Heavy.
[4] Change in thickness after weld: Preweld Lid + Container flange thicknesses minus post weld thickness of bonded lid + container.
[5] Psig: Failure pressure as applied in 5 Psig increments held for one minute; L = Leak.
[6] "NA" means weld did not form sufficiently for burst testing.
[7] Weld times and revolutions per weld not collected due to video equipment malfunction.

within the preferred range of RPMs, (2000 to 3000 RPM), all specimens in this group met the 50 psig burst pressure target.

Whereas the weld time in seconds using the entirely hard surfaced system would average from between 0.8 to 1.1 seconds, the inclusion of just one resilient lid holder significantly reduced the weld time to between 0.2 and 0.4 seconds. (An equipment malfunction in the video equipment prevented collection of data for the remaining samples).

It can also be seen that the revolutions to weld, i.e., how many times one body portion rotated relative to another during the formation of the weld zone, decreased substantially between the entirely "hard" system to the system that incorporated the resilient lid holder. Again, the revolutions to weld time data was not able to be collected due to a malfunction of the video equipment.

The visual appearance of the weld also substantially improved as more resiliency was built into the system.

Other notes in Table 1 set forth the location and amount of flash generated between the inner and outer diameters of the weld junction, along with the post weld thickness in mils, the actual spin head RPM, as well as the energy input in calories, along with the inertial input into the system.

The resilient spin weld apparatus should show benefit in spin welding of all semi-crystalline materials, for example, polypropylene, a semi-crystalline olefinic polymer as disclosed in this work. Some important materials from a food and beverage packaging context for hot filled or retorted packages are polypropylene and its copolymers, polyethylene (low, medium, high density, linear), polybutylene and its copolymers, 4-methylpentene, and its copolymer (TPX ® Polymers available from Mitsui).

The method and apparatus of the present invention should similarly show benefit in the spinwelding of semi-crystalline polar polymers such as PET, polyamides, polyketones, and polyvinyl chloride, for example, as well as semi-crystalline barrier polymers such as ethylene vinyl alcohols, PVDC and its copolymers, as well as acrylonitrile copolymers (Barex). The material used for the body portions may also be blends of these polymers; polymers in a melt index or melt flow range of 0.1 to 40, (which would cover container/lids made by thermoforming, injection molding, blow molding; and/or extusion of sheet as a precursor to thermoforming).

While amorphous polymers have not been spin-welded using this apparatus it is suspected that they may also benefit from their use in the resilient spin weld apparatus. Such amorphous materials would be, for example, amorphous nylons, polystyrene, polycarbonate, acrylics, as well as PETG (non-crystallizing PET).

The process is envisioned to also be applicable to the use of functionalized polymers, such as materials ordinarily used to bond layers of dissimilar materials in multilayer food packages such as Admers (Mitsui), Plexars (Quantum) and Bynels (DuPont).

The envisioned commerical range of interest for this invention would span containers with outside diameters of about 2 inches to about 6 inches. Examples include baby food containers having a relatively small size up to coffee can size packages. Containers ordinarily employing narrow openings such as juice, salad dressings, ketchup and the like could also be fabricated using the resilient spin weld apparatus.

From a welding viewpoint, a minimum thickness of 5 mils for either component is a likely minimum. Thinner components, if stiffer, with less likelihood of wrinkling upon contact and rotation, might reduce this minimum. Much lower than 5 mils thickness, heat sealing is an alternative technology which would come into play. One advantage of the present invention is the ability to quickly weld thick, poor thermal conductivity plastic sections. It should be noted that a thin, 10 mil welded joint (5 mils + 5 mils) will be flimsy in the hands of the consumer. In thermoforming of lids/containers, the starting sheet thickness will likely be a minimum of about 50 mils. It would be impractical and unnecessary to coin flanges or lid areas much less than about ½ of the starting sheet thickness. Functionally speaking therefore, a semi-rigid lid will probably be 10 mils, or greater perhaps to 35 mils. These minimums are governed by stresses found in retorting, shipment, storage, stacking, etc. Therefore a real lower boundary estimate for the final weld thickness is likely approximately 20 mils.

As far as the upper boundary thickness, it is likely that no more than a thermoformable sheet thickness (starting) of 50 mils for the container and lid (for a combined thickness of 100 mils) will be used. However, at this thickness, the effectiveness of the resilient spin-weld apparatus (in some respects) may be reduced due to the increased stiffness of the components.

The major governing factor of the width of the annular mating surfaces is the weld seal width required for hermetically sealing of the comestible in a regulatory sense: about ⅛ of an inch. Thus, flange widths from about ⅛ of an inch upwards will provide an acceptable minimum to meet this important Federal Drug Administration requirement. From a welding viewpoint, it is hard to imagine an actual weld width that could ever be required that exceeded 0.5 inches. It is more likely that 0.25 inches maximum weld width will suffice.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim as our invention:

1. Resilient spinwelding apparatus for use in the manufacture of articles having a first body portion and a second body portion complemental with one another, said body portions having annular mating surfaces, said spinwelding apparatus comprising:
   a first support having a cavity for receiving a portion of said first body portion and having a shoulder at the mouth of said cavity,
   a first resilient mount supported by the shoulder of said first support, said first resilient mount having an end face shaped to operatively engage said first body portion,
   a second support,
   a second resilient mount operatively engaged to said second support and operatively engageable with said second body portion so as to initially space said second body portion away from said first body portion, said second resilient mount being movable relative to said first resilient mount to contact said body portions at said annular mating surfaces, rotation of said second resilient mount relative to said first resilient mount being operable to spinweld said body portions at said annular mating surfaces when said body portions are contacted together,
   means for moving at least one of said resilient mounts relative to said other resilient mount to contact said body portions at the mating surfaces thereof, and
   means for rotatably moving at least one of said resilient mounts when said body portions are contacted together to spinweld the latter at said mating surfaces.

2. Resilient spinwelding apparatus for use in joining a cup and a complemental lid together, said cup having a flange defined about the upper periphery thereof, said cup flange and lid having annular mating surfaces, said spinwelding apparatus comprising;
   a cup holder having a cavity for receiving a portion of said cup and having an annular shoulder at the mouth of said cavity,
   a resilient ring supported by the annular shoulder of said cup holder, said resilient ring having an end face shaped to support said cup flange,
   a spinhead,
   a resilient disk operatively engaged to said spinhead and operatively engageable with said lid, said resilient disk initially spacing the lid from the cup, said resilient disk being movable toward said resilient ring to contact said cup flange and lid at said annular mating surfaces, rotational movement of said resilient disk relative to said resilient ring being operable to spinweld said cup flange and said lid at said annular mating surfaces when said cup flange and said lid are contacted together,
   means for moving said resilient disk relative to said resilient ring to contact said cup flange and said lid at the mating surfaces thereof, and
   means for rotationally moving said resilient disk relative to said resilient ring when said cup flange and said lid are contacted together to spinweld the lid to the cup flange at said mating surfaces.

3. The apparatus of claim 2 wherein said resilient ring has a circular opening defined therethrough having a diameter at least equal to the outer diameter of said cup, said resilient ring having a lower face cooperatively engaged with and carried by said annular shoulder of said cupholder.

4. The apparatus of claim 2 wherein said spinhead further includes;
   a central vacuum opening defined therethrough,
   a vacuum plate carried on the surface of said spinhead facing said resilient disk, said vacuum plate having a recess cavity sized for acceptance of said resilient disk therein, said recess cavity being connected via vacuum plate openings defined through said vacuum plate to said central vacuum opening so that said resilient disk is operatively engaged to said vacuum plate by atmospheric pressure acting on a portion of said disk when air is removed from said central vacuum opening.

5. The apparatus of claim 2 wherein said resilient disk has an outer diameter at least as great as the outer radius of said annular mating surfaces.

6. The apparatus of claim 2 wherein said resilient disk further includes a group of openings defined therethrough, the outer diameter of said group of openings being less than the inner radius of said annular mating surfaces, said openings being in fluid communication with a central vacuum opening defined through said spinhead so as to retain said lid adjacent said resilient disk by atmospheric pressure acting on a portion of said lid.

* * * * *